(12) United States Patent
Lozhkin

(10) Patent No.: US 9,374,256 B2
(45) Date of Patent: Jun. 21, 2016

(54) TRANSMITTER AND METHOD FOR REDUCING PEAK-TO-AVERAGE POWER RATIO

(71) Applicant: FUJITSU LIMITED, Kawasaki-shi, Kanagawa (JP)

(72) Inventor: Alexander Nikolaevich Lozhkin, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/734,194

(22) Filed: Jun. 9, 2015

(65) Prior Publication Data
US 2016/0043889 A1    Feb. 11, 2016

(30) Foreign Application Priority Data
Aug. 6, 2014    (JP) .................. 2014-159991

(51) Int. Cl.
  *H04L 27/26*    (2006.01)
  *H04L 1/00*    (2006.01)
  *H04B 15/00*    (2006.01)
  *H04B 1/04*    (2006.01)
  *H04L 27/36*    (2006.01)

(52) U.S. Cl.
  CPC .......... *H04L 27/2623* (2013.01); *H04L 1/0003* (2013.01); *H04B 1/0475* (2013.01); *H04L 27/368* (2013.01)

(58) Field of Classification Search
  CPC ............ H04L 27/2623; H04L 27/2614; H04L 27/2624; H04L 27/3411; H04L 27/368; H04L 1/0003; H04B 2201/70706; H04B 1/0475
  See application file for complete search history.

(56) References Cited

U.S. PATENT DOCUMENTS

| 2003/0086507 A1* | 5/2003 | Kim ................. H04L 27/2624 375/297 |
| 2004/0170228 A1* | 9/2004 | Vadde ................ H04L 25/497 375/260 |

(Continued)

FOREIGN PATENT DOCUMENTS

WO    2008129645    10/2008

OTHER PUBLICATIONS

Jean Armstrong, "New OFDM Peak-to-Average Power Reduction Scheme", IEEE Vehicular Technology Conference, 2001, Rhodes, Greece, pp. 756-760 (5 pages).

(Continued)

*Primary Examiner* — Chieh M Fan
*Assistant Examiner* — Michelle M Koeth
(74) *Attorney, Agent, or Firm* — Fujitsu Patent Center

(57) ABSTRACT

A transmitter includes: first and second IFFT units that respectively generate first and second time domain signals from first and second modulated signals generated in first and second modulation schemes; a clipping noise signal generator that generates a clipping noise signal representing a difference between a combined signal of the first and second time domain signals and a specified threshold in a time period in which the power of the combined signal is higher than the threshold; first and second calculators that respectively subtract the clipping noise signals to which first and second coefficients are multiplied from the first and second time domain signals; first and second frequency filters that respectively filter output signals of the first and second calculators; and a combiner that generates a transmission signal including an output signal of the first frequency filter and an output signal of the second frequency filter.

7 Claims, 14 Drawing Sheets

(56) References Cited

U.S. PATENT DOCUMENTS

| | | | | |
|---|---|---|---|---|
| 2009/0323857 A1* | 12/2009 | Singh | ........... | H04L 27/2624 375/297 |
| 2010/0014559 A1* | 1/2010 | Nieto | ........... | H04L 27/2614 375/130 |
| 2010/0148828 A1* | 6/2010 | Nagatani | ........... | H04L 27/2623 327/105 |
| 2011/0009153 A1* | 1/2011 | Chiba | ........... | H04B 1/0475 455/522 |
| 2013/0115899 A1* | 5/2013 | Hansen | ........... | H04L 27/2624 455/114.2 |

OTHER PUBLICATIONS

Andreas Saul, "Analysis of Peak Reduction in OFDM Systems Based on Recursive Clipping", Proc. of Int. OFDM-Workshop, vol. 1, Hamburg, Germany, Sep. 24-25, 2003 (5 pages).

* cited by examiner

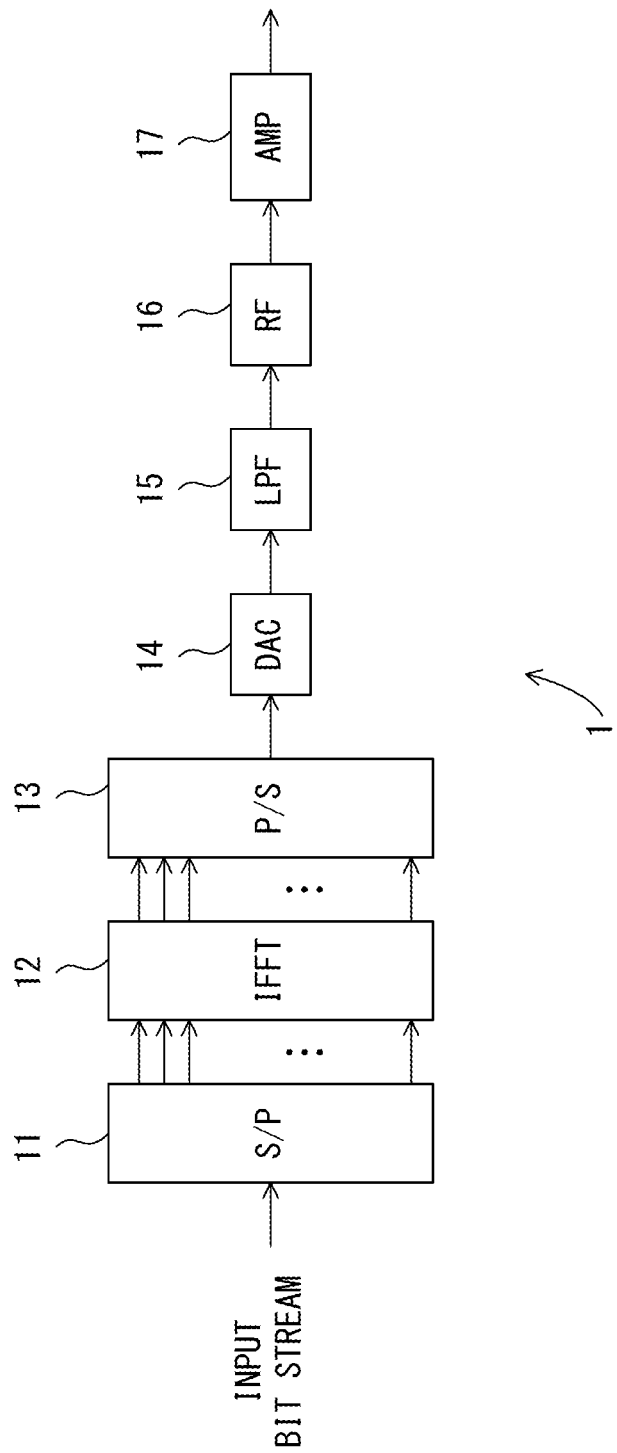
F I G. 1

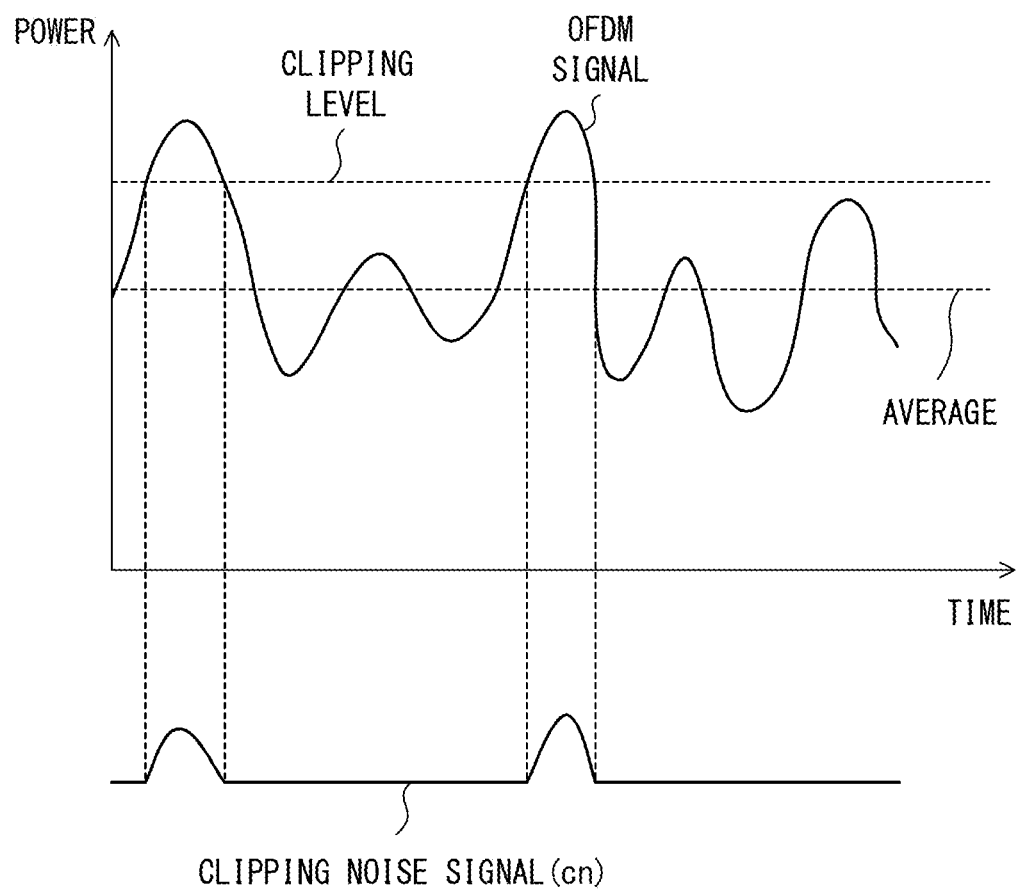
F I G. 2

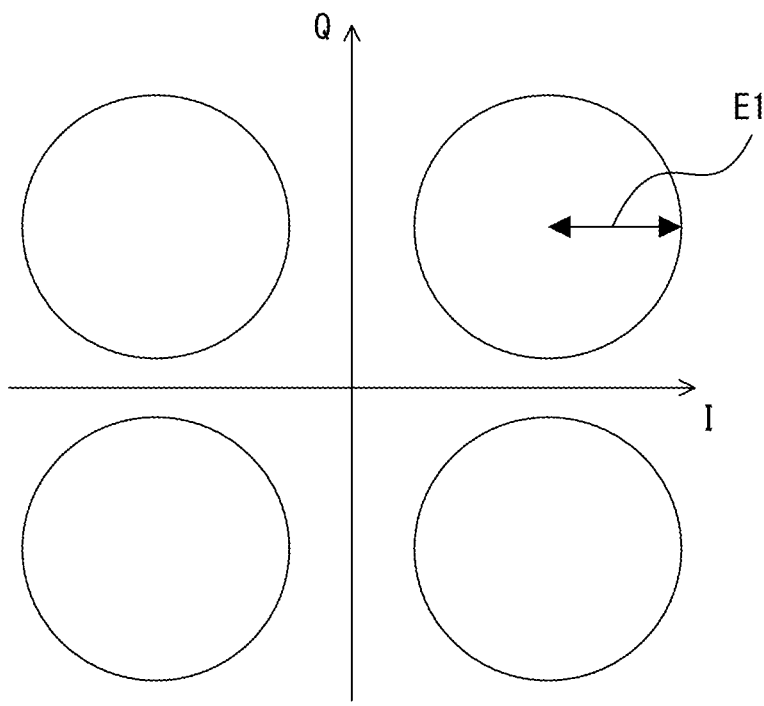
F I G. 4

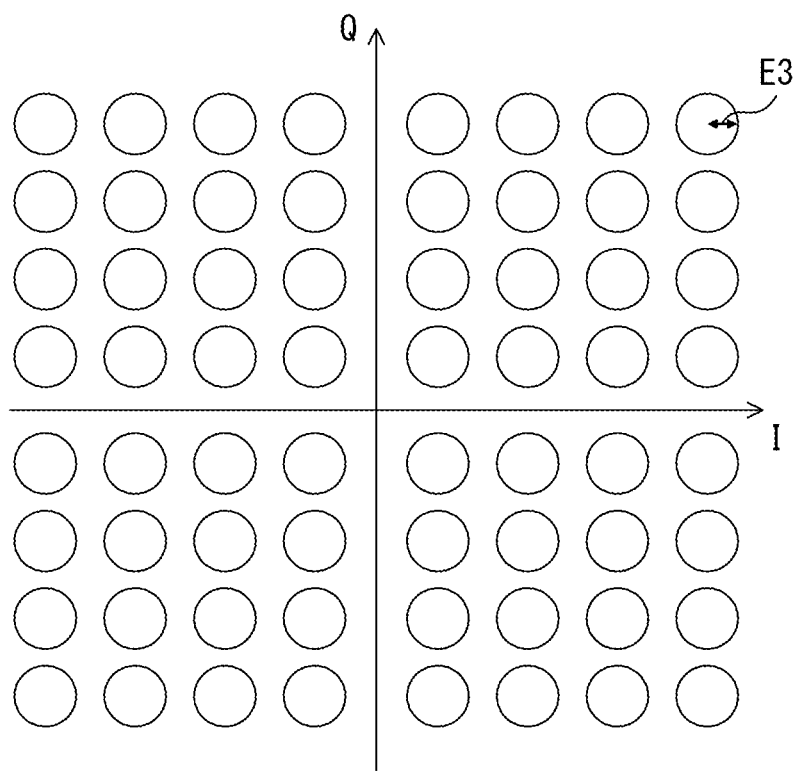
F I G. 6

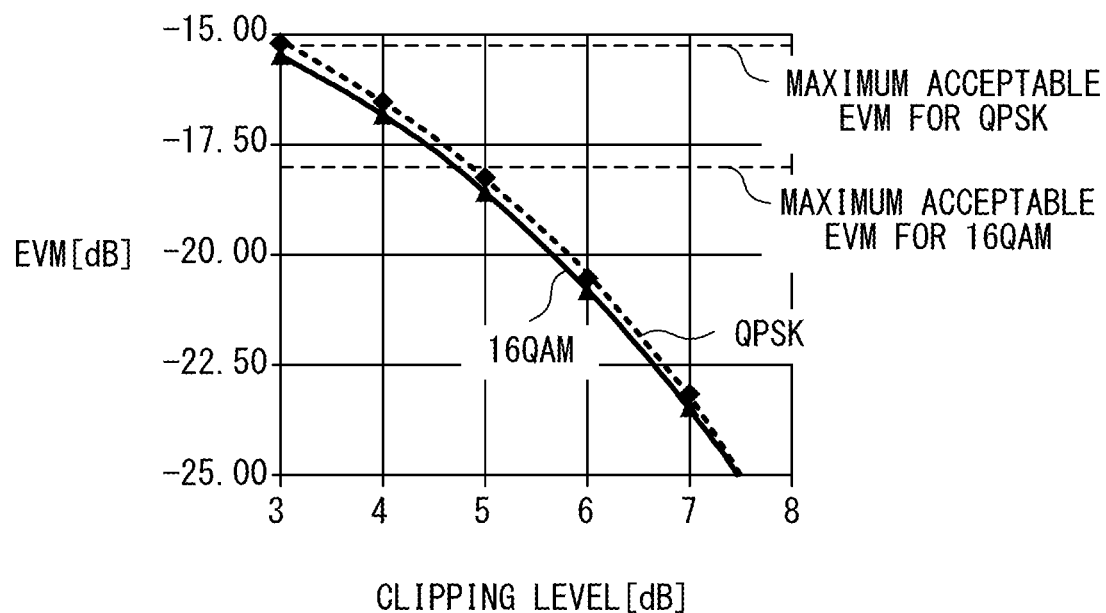
F I G. 7

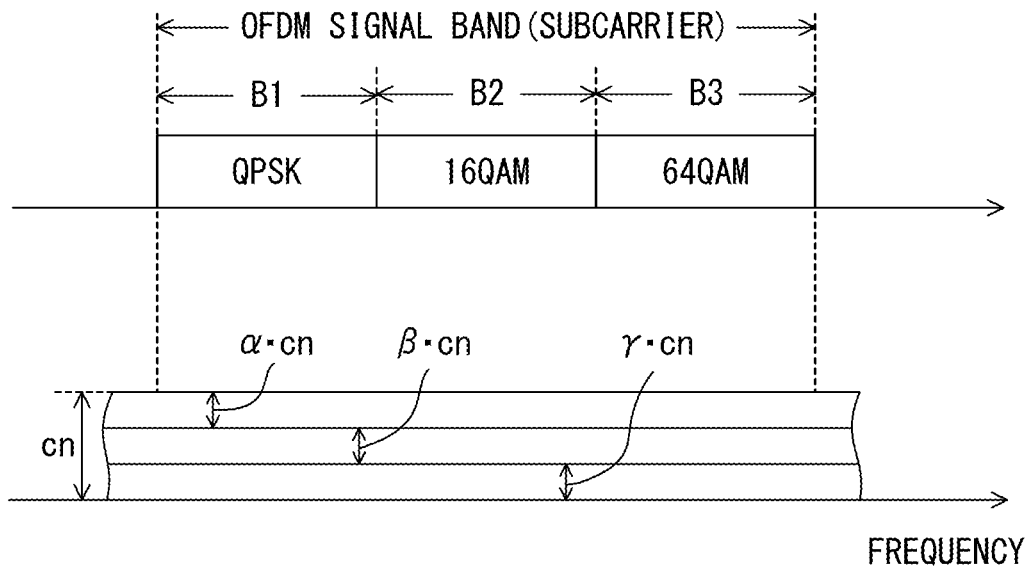
F I G. 9

F I G. 1 0 A
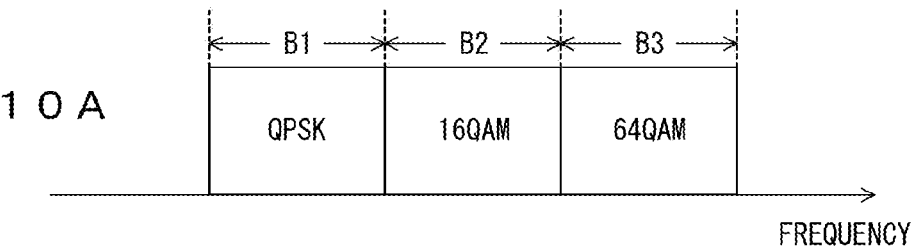
F I G. 1 0 B
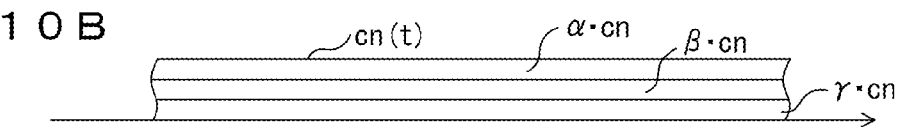
F I G. 1 0 C
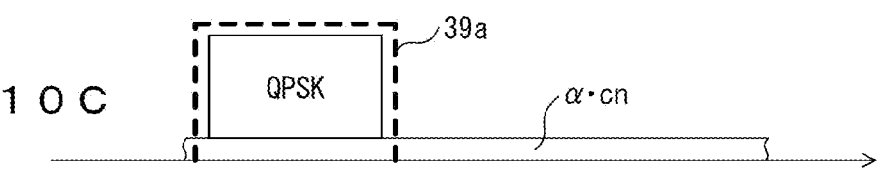
F I G. 1 0 D
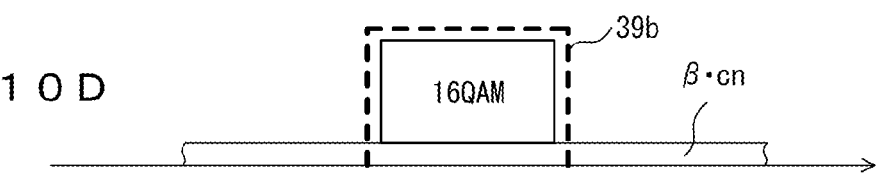
F I G. 1 0 E
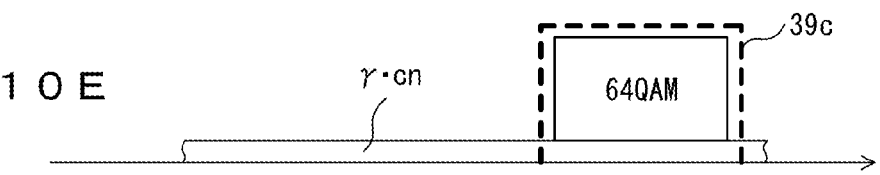
F I G. 1 0 F
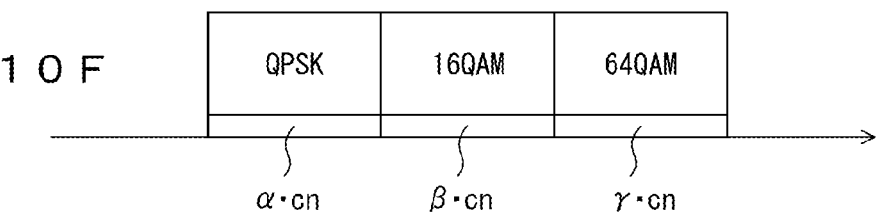

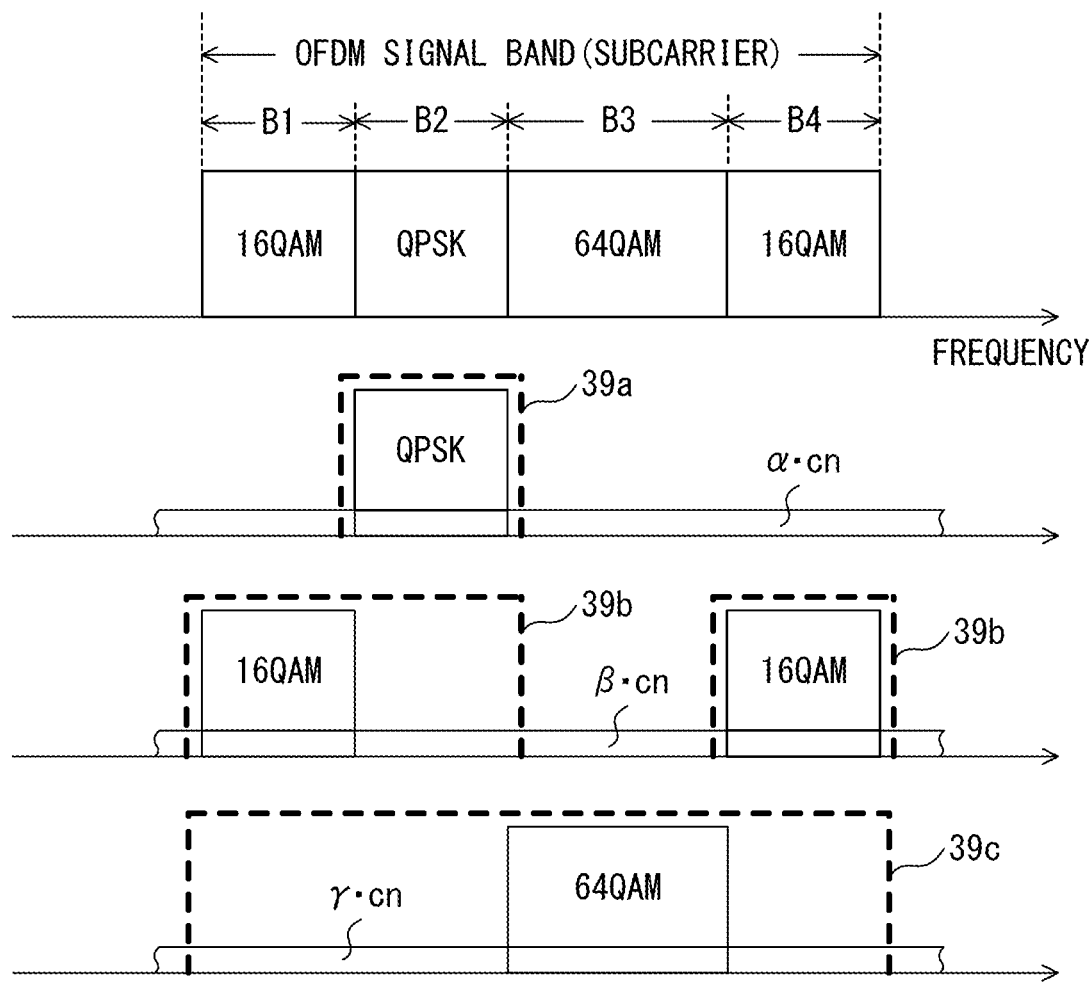
F I G. 1 2

FIG. 13A
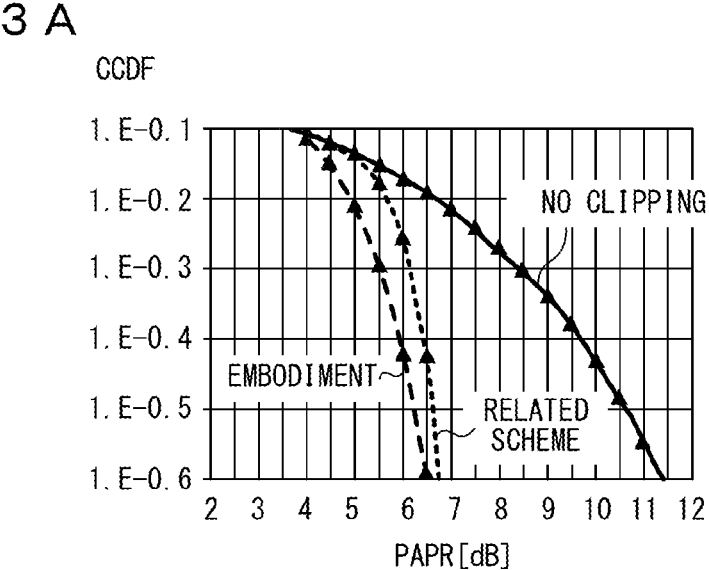
FIG. 13B
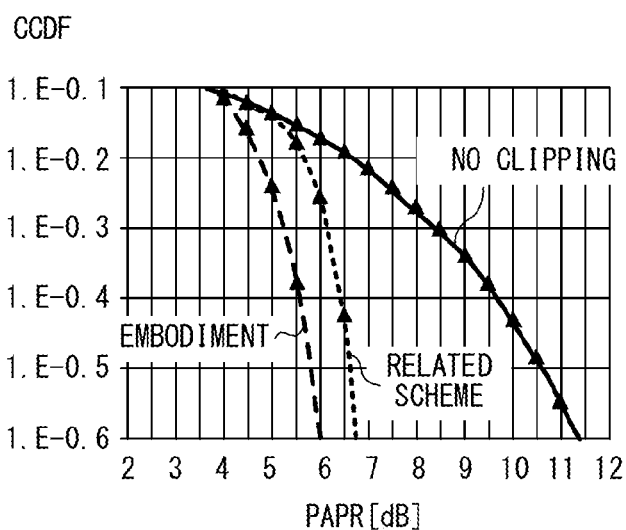
FIG. 13C
|  | 3GPP MAX EVM | RELATED SCHEME (FIG. 3) | EMBODIMENT (FIG. 8, 13A) | EMBODIMENT (FIG. 8, 13B) |
|---|---|---|---|---|
| QPSK | −15.1 | −18.3 | −15.16 | −15.51 |
| 16QAM | −18.1 | −18.5 | −18.17 | −18.23 |

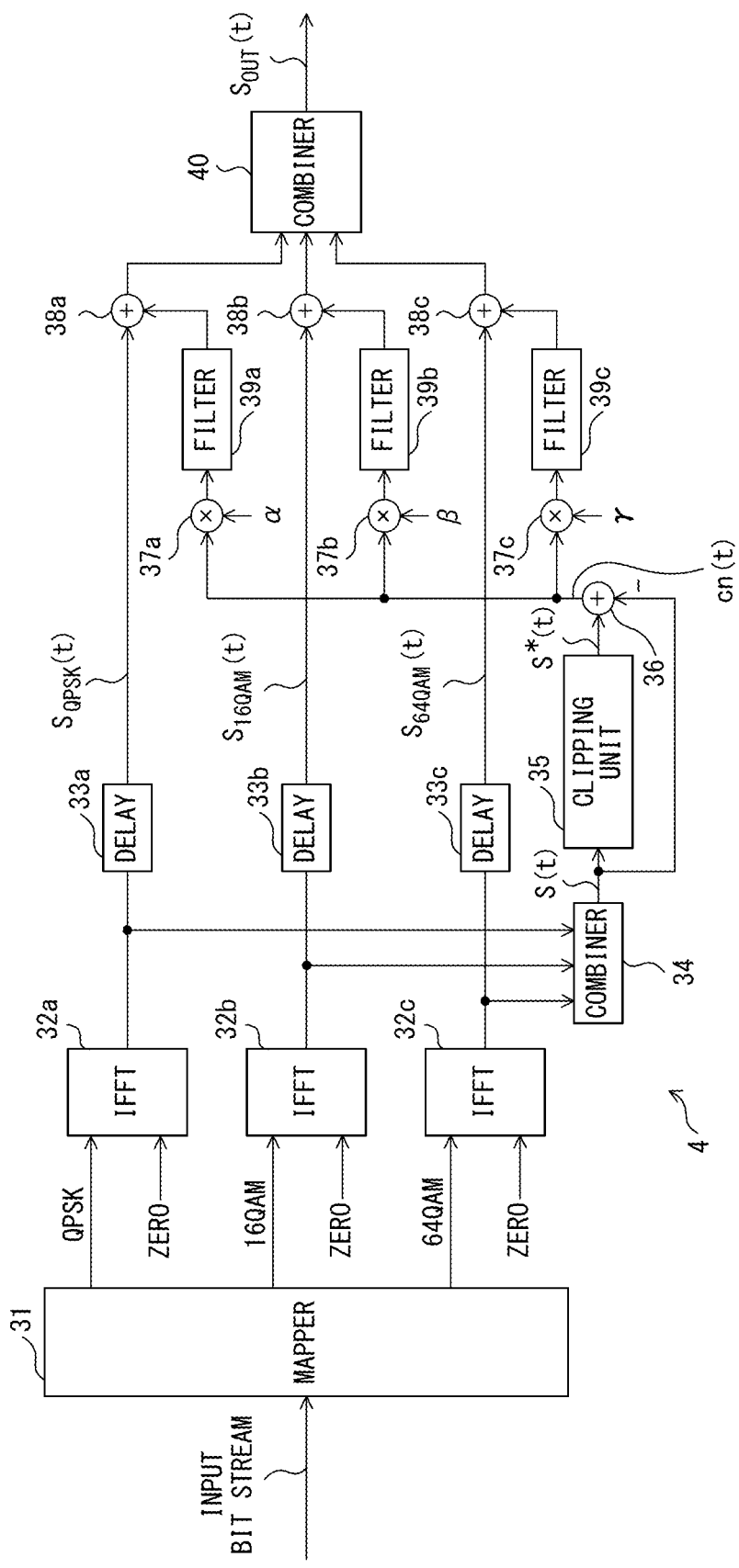
F I G. 14

TRANSMITTER AND METHOD FOR REDUCING PEAK-TO-AVERAGE POWER RATIO

CROSS-REFERENCE TO RELATED APPLICATION

This application is based upon and claims the benefit of priority of the prior Japanese Patent Application No. 2014-159991, filed on Aug. 6, 2014, the entire contents of which are incorporated herein by reference.

FIELD

The present invention is related to a transmitter that transmits a multiplexed signal including a plurality of modulated signals generated in different modulation schemes and a method for reducing a peak-to-average power ratio of the multiplexed signal.

BACKGROUND

The amount of information transmitted in networks has increased because of the spread of internet technology and so on, and a large capacity transmission scheme is requested. As one of the schemes that increases transmission capacity, OFDM (Orthogonal Frequency Division Multiplexing) has been put into practical use. OFDM transmits data by using a plurality of subcarriers orthogonal to each other. Thus, OFDM may transmit a plurality of signals modulated in different modulation schemes.

However, since a plurality of modulated signals are multiplexed in OFDM, a large peak power may occur. That is to say, a peak-to-average power ratio (PAPR) may be high in OFDM.

When the PAPR in the OFDM signal is high, a transmitter requires a high-power amplifier with a wide dynamic range. However, high-power amplifiers with a wide dynamic range are expensive and have a low power efficiency. Note that when the dynamic range of the amplifier is narrow and the OFDM signal is amplified in the non-linear range, a waveform of the signal is distorted. In this case, communication quality deteriorates.

This problem (that is, that the PAPR in the OFDM signal is high) may be solved by, for example, a function to clip a peak of the OFDM signal. This "clipping" is realized by removing the peak power higher than a specified threshold. Note that a method for clipping a peak in the OFDM signal is described by, for example, [1] J. Armstrong, "New OFDM Peak-to-Average Power Reduction Scheme", IEEE Vehicular Technology Conference, Amy 2001, Rhodes, Greece, and [2] A. Saul, Analysis of Peak Reduction in OFDM Systems Based on Recursive Clipping, Proc. of Int. OFDM-Workshop, Vol. 1, Hamburg, Germany, Sep, 24-25, 2003. In addition, WO 2008/129645 describes related art.

As described above, it is possible to reduce the PAPR in the OFDM signal by clipping a peak in the OFDM signal. However, if the peak in the OFDM signal is reduced too much, the quality of the signal deteriorates. In this case, a receiver sometimes cannot demodulate the signal correctly. Therefore, it is preferable to determine the threshold (hereinafter, this may be referred to as a "clipping level") for clipping a peak of the OFDM signal according to a modulation scheme of the signal multiplexed in the OFDM signal.

However, the OFDM signal may transmit a plurality of modulated signals generated in different modulation schemes. When a plurality of modulated signals generated in different modulation schemes are multiplexed in the OFDM signal, a specified quality should be ensured for each modulation scheme. That is, it is requested that a quality of a signal be higher than the required level for each modulation scheme.

In order to ensure the quality of the signal for all modulation schemes, a clipping level that corresponds to a modulation scheme with the highest required quality may be used. When the quality of the signal is indicated by an Error Vector Magnitude (EVM), the clipping level is determined based on the modulation scheme with the smallest acceptable EVM. For example, when a QPSK signal, a 16QAM signal and a 64QAM signal are multiplexed in an OFDM signal, the clipping level is determined based on the acceptable EVM for the 64QAM.

However, if the clipping level corresponding to the modulation scheme with the smallest acceptable EVM is applied to all modulation schemes, a modulation scheme with the larger acceptable EVM has a margin in EVM. In other words, it is possible to further reduce the PAPR by using a lower clipping level for the modulation scheme with the larger acceptable EVM. Thus, it is considered that the PAPR in the OFDM signal is not sufficiently reduced in the prior art.

SUMMARY

According to an aspect of the embodiments, a transmitter includes: a first IFFT (inverse fast Fourier transform) unit that generates a first time domain signal from a first modulated signal that is generated in a first modulation scheme and allocated in a first frequency band; a second IFFT unit that generates a second time domain signal from a second modulated signal that is generated in a second modulation scheme and allocated in a second frequency band; a clipping noise signal generator that generates a clipping noise signal that represents a difference between a combined signal of the first time domain signal and the second time domain signal and a specified threshold in a time period in which the power of the combined signal is higher than the threshold; a first calculator that subtracts the clipping noise signal to which a first coefficient is multiplied from the first time domain signal; a second calculator that subtracts the clipping noise signal to which a second coefficient is multiplied from the second time domain signal; a first frequency filter that filters an output signal of the first calculator; a second frequency filter that filters an output signal of the second calculator; and a combiner that generates a transmission signal that includes an output signal of the first frequency filter and an output signal of the second frequency filter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a configuration of a transmitter that transmits an OFDM signal.

FIG. 2 is a diagram that explains PAPR and clipping.

FIG. 4 schematically illustrates the maximum acceptable EVM for QPSK.

FIG. 6 schematically illustrates the maximum acceptable EVM for 64QAM.

FIG. 7 illustrates EVM with respect to a clipping level obtained by the transmitter in FIG. 3.

FIG. 9 illustrates subcarrier allocation and clipping noise.

FIGS. 10A-10F illustrate an example of a configuration of filters.

FIG. 12 illustrates an example of filters configured to another signal allocation.

FIGS. 13A-13C illustrate a simulation result on PAPR reduction.

FIG. 14 illustrates a configuration of a transmitter according to another embodiment of the present invention.

DESCRIPTION OF EMBODIMENTS

Figure 3:
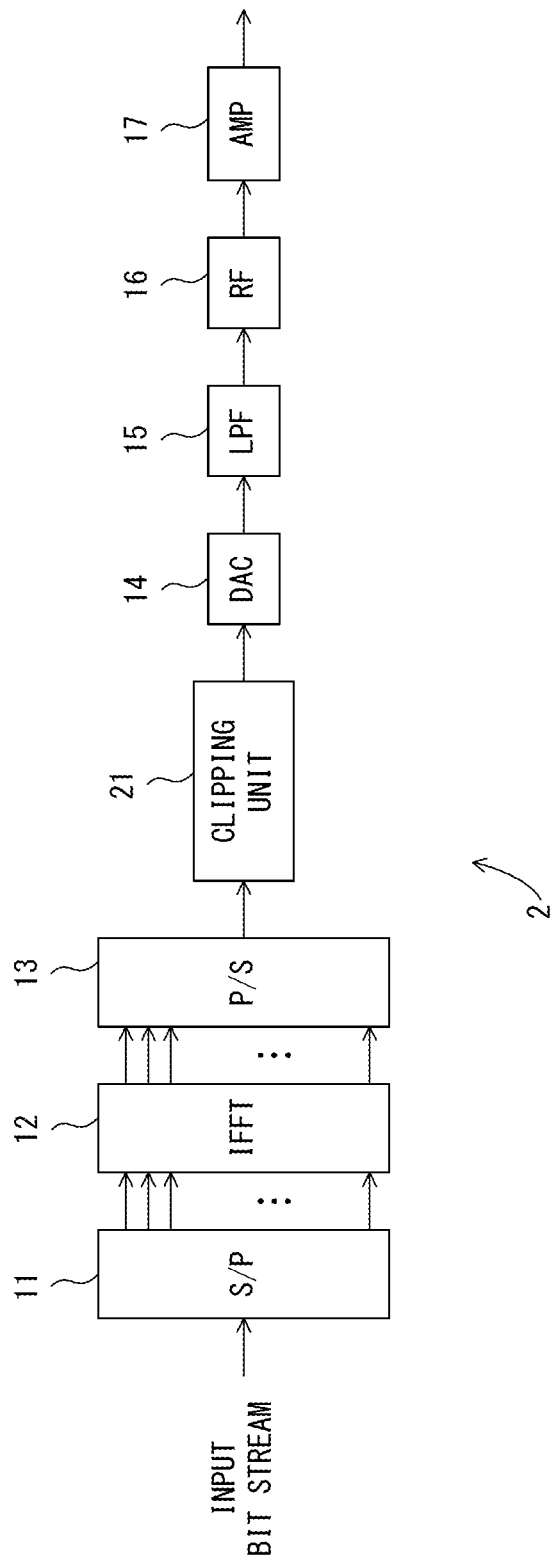
FIG. 3 illustrates an example of a configuration of a transmitter that has a function to reduce the PAPR.

A transmitter according to an embodiment of the present invention can multiplex a plurality of modulated signals generated in different modulation schemes and transmit the multiplexed signal. An example of the multiplexing is OFDM (Orthogonal Frequency Division Multiplexing). OFDM can transmit one or a plurality of modulated signals using a plurality of subcarriers. In the following description, it is assumed that the transmitter according to the embodiment of the present invention transmits an OFDM signal.

FIG. 1 illustrates an example of a configuration of a transmitter that transmits an OFDM signal. The transmitter 1 includes, as illustrated in FIG. 1, a serial-to-parallel (S/P) converter 11, an inverse fast Fourier transform (IFFT) unit 12, a parallel-to-serial (P/S) converter 13, a digital-to-analog (DAC) converter 14, a low-pass filter (LPF) 15, an up-converter (RF) 16, and an amplifier 17.

An input bit stream is guided to the S/P converter 11. The S/P converter 11 converts the serial input bit stream into a parallel bit stream. The parallel bit stream output from the S/P converter 11 is allocated to a plurality of subcarriers of different frequencies. The IFFT unit 12 performs IFFT on the parallel bit stream output from the S/P converter 11 to generate a time domain signal. The P/S converter 13 converts the time domain signal output from the IFFT unit 12 into serial data. The DAC 14 converts the output signal of the P/S converter 13 into an analog signal. The LPF 15 removes higher frequency components from the output signal of the DAC 14. The up-converter 16 converts the output signal of the LPF 15 into a radio frequency signal. The amplifier 17 amplifies the output signal of the up-converter 16. Thus, the transmitter 1 generates an OFDM signal using a plurality of subcarriers.

The transmitter 1 may have other functions not illustrated in FIG. 1. For example, the transmitter 1 may have an oversampling circuit between the P/S converter 13 and the DAC 14. In this case, the oversampling circuit will operate as an interpolator. Alternatively, the transmitter 1 may implement a similar function by increasing the size of the IFFT unit 12 in place of providing the oversampling circuit.

In OFDM, a peak-to-average power ratio (PAPR) may become high. When the PAPR is high, the transmitter requires a high-power amplifier with a wide dynamic range. In the transmitter 1 illustrated in FIG. 1, the amplifier 17 is requested to have a wide dynamic range. However, a high-power amplifier with a wide dynamic range is expensive and has a low power efficiency. Therefore, it is preferable that the OFDM transmitter have a function to reduce the PAPR.

<Related Scheme>

FIG. 2 is a diagram that explains PAPR and clipping. The power (or amplitude) of an OFDM signal changes in a time domain as illustrated in FIG. 2. PAPR indicates a ratio of a peak power of the OFDM signal to an average power of the OFDM signal.

FIG. 3 illustrates an example of a configuration of a transmitter that has a function to reduce the PAPR. As illustrated in FIG. 3, the transmitter 2 has a clipping unit 21 in addition to the configuration illustrated in FIG. 1. The clipping unit 21 removes a peak component that exceeds a specified threshold power (a clipping level in FIG. 2) from the OFDM signal.

Note that a plurality of modulated signals may be multiplexed in the OFDM signal. In the following description, it is assumed that a QPSK signal, a 16QAM signal, and a 64QAM signal are multiplexed in the OFDM signal. In this case, a transmission signal S(t) is represented by the following formula.

$$S(t) = S_{QPSK}(t) + S_{16QAM}(t) + S_{64QAM}(t)$$

$S_{QPSK}(t)$, $S_{16QAM}(t)$ and $S_{64QAM}(t)$ indicate the QPSK signal, the 16QAM signal, and the 64QAM signal, respectively. The QPSK signal, the 16QAM signal, and the 64QAM signal are independent from each other in a time domain.

The clipping unit 21 clips the transmission signal S(t). Clipping may be applied to a complex amplitude value output from the IFFT unit 12. Here, it is assumed that the transmission signal S(t) is represented by "$\rho \cdot \exp(j\phi)$", and that "A" represents a clipping level. In this case, when the transmission signal S(t) is input to the clipping unit 21, an output signal S*(t) is represented by the following formula.

$$S^*(t) = S(t) \text{ (when } \rho \leq A\text{)}$$

$$S^*(t) = A \cdot \exp(j\phi) \text{ (when } \rho > A\text{)}$$

This clipping operation may distort a waveform of the transmission signal S(t). The distortion may be represented by an error vector magnitude (EVM), for example. The maximum acceptable EVM is defined in 3GPP (Third Generation Partnership Project) as follows.

QPSK: −15.1 [dB]
16QAM: −18.1 [dB]
64QAM: −21.9 [dB]

Figure 5:
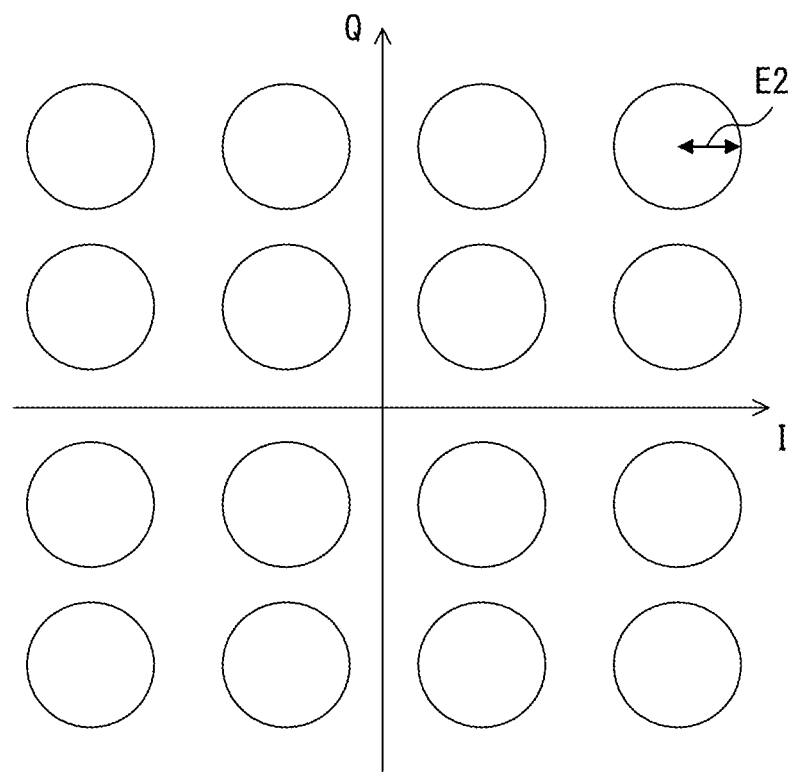
FIG. 5 schematically illustrates the maximum acceptable EVM for 16QAM.

FIGS. 4, 5 and 6 schematically illustrate the maximum acceptable EVM for QPSK, 16QAM and 64QAM, respectively. In FIGS. 4-6, a radius of each circle represents the maximum acceptable EVM. That is, the EVM of a received symbol for QPSK is requested to be smaller than E1, which is illustrated in FIG. 4. The EVM of a received symbol for 16QAM is requested to be smaller than E2, which is illustrated in FIG. 5. The EVM of a received symbol for 64QAM is requested to be smaller than E3, which is illustrated in FIG. 6. Note that the maximum acceptable EVM may be smaller for a modulation scheme in which the number of bits transmitted by one symbol is large. Thus, E1>E2>E3 may be obtained.

However, in the configuration illustrated in FIG. 3, even when a plurality of modulated signals generated in different modulation schemes (such as $S_{QPSK}(t)$, $S_{16QAM}(t)$, $S_{64QAM}(t)$) are multiplexed in the transmission signal S(t), the same clipping level is applied to the modulation schemes. Thus, in this configuration, for example, when average signal powers of respective modulation schemes are the same, EVMs of the clipped signals output from the clipping unit 21 are substantially the same irrespective of the modulation schemes.

FIG. 7 illustrates an EVM with respect to the clipping level obtained by the transmitter in FIG. 3. It is assumed that the clipping level is defined for the average power of the OFDM signal. The number of the subcarriers is 1200, of which 600 subcarriers are allocated to the QPSK signal, and the other 600 subcarriers are allocated to the 16QAM signal. The size of FFT is 2048.

When clipping is performed on the OFDM signal by the transmitter 2 illustrated in FIG. 3, the EVM characteristics of the QPSK signal and the 16QAM signal are substantially the same as each other, as illustrated in FIG. 7. Here, in order to ensure a specified quality for both the QPSK signal and the 16QAM signal, it is requested that the EVM of each of the modulation schemes be smaller than a corresponding maximum acceptable EVM. That is, it is requested that the EVM of the QPSK signal be smaller than −15.1 dB and the EVM of the 16QAM signal be smaller than −18.1 dB. This condition will be satisfied if the clipping level is determined in such a way that the EVM of both the QPSK signal and the 16QAM signal are smaller than −18.1 dB. That is, if the clipping level is determined to be higher than 4.8 dB in FIG. 7, the EVM of the QPSK signal and the 16QAM signal are smaller than −18.1 dB, and specified qualities are satisfied for both the QPSK signal and the 16QAM signal.

However, the requested quality for QPSK is lower than that of 16QAM. That is, the maximum acceptable EVM defined for QPSK is larger than that of 16QAM. Thus, for the QPSK signal, it is possible to perform stronger clipping as long as the EVM is smaller than −15.1 dB. In the example illustrated in FIG. 7, the clipping level for QPSK can be lowered to 3 dB. Note that lowering the clipping level causes stronger clipping and the PAPR will be further reduced.

As described, in the configuration that aggregately clips the OFDM signal, the clipping level corresponding to the modulation scheme that is requested to have the highest quality (16QAM in FIG. 7) is applied to all of the modulation schemes used in the OFDM signal. Thus, with respect to the modulation scheme whose requested quality is low (QPSK in FIG. 7), insufficient clipping is performed even though stronger clipping can be performed. In other words, with respect to the modulation scheme whose requested quality is low, the PAPR is not sufficiently reduced even though the PAPR can be further reduced.

This problem may occur when the OFDM signal includes modulated signals generated in three or more different modulation schemes. For example, when the OFDM signal includes the QPSK signal, 16QAM signal, and the 64QAM signal, the clipping level is determined in such a way that the quality (EVM in this example) requested for the 64QAM signal may be satisfied. In this case, it is possible to further reduce the PAPR in the QPSK signal and the 16QAM signal while ensuring corresponding requested qualities. In other words, according to the configuration illustrated in FIG. 3, the PAPR is not sufficiently reduced.

<Embodiment of the Present Invention>

The aforementioned problem may be solved by performing the clipping respectively for the modulation schemes. That is to say, if clipping is performed respectively for the modulation schemes, PAPR reduction in the OFDM signal will be improved.

However, if clipping is simply performed respectively on the QPSK signal, the 16QAM signal, and the 64QAM signal, and then the clipped signals are combined, the PAPR will not be reduced. Therefore, the transmitter according to the embodiment of the present invention reduces the PAPR in the transmission signal while considering the quality (maximum acceptable EVM in the example) of respective modulation schemes.

Figure 8:
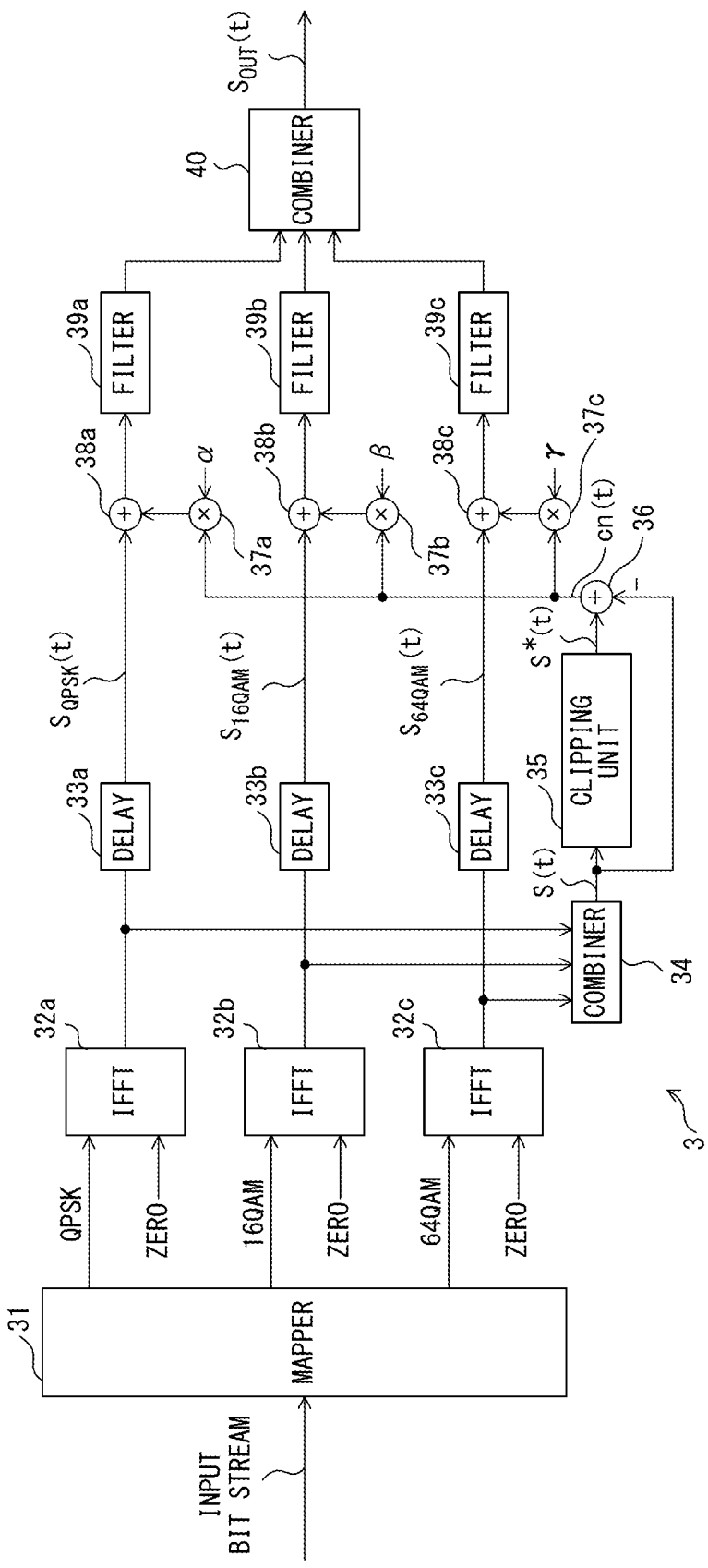
FIG. 8 illustrates an example of a configuration of a transmitter according to an embodiment of the present invention.

FIG. 8 illustrates an example of a configuration of a transmitter according to the embodiment of the present invention. The transmitter 3 according to the embodiment includes, as illustrated in FIG. 8, a mapper 31, IFFT units 32a-32c, delay elements 33a-33c, a combiner 34, a clipping unit 35, a difference calculator 36, multipliers 37a-37c, adders 38a-38c, filters 39a-39c, and a combiner 40. Note that FIG. 8 illustrates some of the functions to generate and transmit an OFDM signal, and the transmitter 3 may include other functions not illustrated in the figure. For example, the DAC 14, the LPF 15, the up-converter 16, and the amplifier 17 illustrated in FIG. 1 or FIG. 3 may be provided on the output side of the combiner 40. In addition, the mapper 31, the IFFT units 32a-32c, the delay elements 33a-33c, the combiner 34, the clipping unit 35, the difference calculator 36, the multipliers 37a-37c, the adders 38a-38c, the filters 39a-39c, and the combiner 40 may be implemented by a digital signal processor including a processor and memory, or may be implemented by a combination of the digital signal processor and a hardware circuit.

The mapper 31 generates modulated signals from the input bit stream according to a specified modulation instruction. The modulation instruction indicates modulation schemes to be used and subcarrier allocation for the modulated signals in the OFDM signal. In this example, QPSK, 16QAM, and 64QAM may be used. Thus, the mapper 31 may generate a QPSK signal, a 16QAM signal, and a 64QAM signal.

The IFFT units 32a-32c respectively perform IFFT on corresponding input signals to generate time domain signals. The size of each of the IFFT units 32a-32c is N. The IFFT unit 32a performs IFFT on the QPSK signal obtained by the mapper 31 and generates a time domain signal $S_{QPSK}(t)$. The IFFT unit 32b performs IFFT on the 16QAM signal obtained by the mapper 31 and generates a time domain signal $S_{16QAM}(t)$. The IFFT unit 32c performs IFFT on the 64QAM signal obtained by the mapper 31 and generates a time domain signal $S_{64QAM}(t)$. Note that a necessary number of "zeros" are fed to the IFFT units 32a-32c. For example, when x subcarriers are allocated to the QPSK signal, N-x "zeros" are fed to the IFFT unit 32a.

The delay elements 33a-33c temporarily store output signals of the IFFT units 32a-32c, respectively. The delay period of the delay elements 33a-33c correspond to an operation time by the combiner 34, the clipping unit 35, the difference calculator 36 and the multipliers 37a-37c.

The combiner 34 combines the output signals of the IFFT units 32a-32c. That is to say, the combiner 34 generates the transmission signal S(t) below.

$$S(t)=S_{QPSK}(t)+S_{16QAM}(t)+S_{64QAM}(t)$$

The clipping unit 35 removes a peak component that exceeds a specified threshold power from the transmission signal S(t). In the example illustrated in FIG. 2, a peak component that exceeds the clipping level is removed from the OFDM signal. The clipping level may be determined based on simulation and so on. For example, the clipping level may be determined in such a way that the EVM of the clipped transmission signal matches a specified reference value (for example, the maximum acceptable EVM defined for 64QAM: −21.9 dB). Note that the clipping level may be determined between the average power and the peak power of the transmission signal S(t). Then the clipping unit 35 generates a clipped transmission signal S*(t).

The clipped transmission signal S*(t) may be represented by the following formula.

$$S^*(t)=S(t)-cn(t) \quad (1)$$

cn(t) represents a difference between the transmission signal S(t) and the clipping level. Note that when the power of the transmission signal S(t) is lower than or equal to the clipping level, cn(t) is zero. That is, cn(t) represents a difference between the transmission signal S(t) and the clipping level in the time period in which the power of the transmission signal S(t) is higher than the clipping level. In the following description, cn(t) may be referred to as a "clipping noise signal" or simply as "clipping noise".

The difference calculator 36 calculates a difference between the transmission signal S(t) and the clipped transmission signal S*(t). The difference indicates the clipping noise signal according to formula (1). That is, the clipping noise signal cn(t) is generated by the clipping unit 35 and the difference calculator 36. An example of the clipping noise signal cn(t) is illustrated in FIG. 2. Note that since the signal S(t) is subtracted from the signal S*(t) in the configuration illustrated in FIG. 8, the difference calculator 36 outputs "−cn(t)".

The multiplier 37a multiplies the clipping noise signal by a coefficient α. That is, the multiplier 37a generates a product of the clipping noise signal and the coefficient α. As a result, −α·cn(t) is output from the multiplier 37a. Then the adder 38a adds the output signal of the multiplier 37a to the QPSK signal $S_{QPSK}(t)$. Thus, the clipping noise component α·cn(t) is subtracted from the QPSK signal $S_{QPSK}(t)$.

Similarly, the multiplier 37b multiplies the clipping noise signal by a coefficient β, and the adder 38b adds the output signal of the multiplier 37b to the 16QAM signal $S_{16QAM}(t)$. Thus, the clipping noise component β·cn(t) is subtracted from the 16QAM signal $S_{16QAM}(t)$. The multiplier 37c multiplies the clipping noise signal by a coefficient γ, and the adder 38c adds the output signal of the multiplier 37c to the 64QAM signal $S_{64QAM}(t)$. Thus, the clipping noise component γ·cn(t) is subtracted from the 64QAM signal $S_{64QAM}(t)$.

The operation of the clipping unit 35, the difference calculator 36, the multipliers 37a-37c, and the adders 38a-38c may be represented by the following formula (2).

$$S^*(t) = S(t) - cn(t)$$

$$S^*(t) = S_{QPSK}(t) + S_{16QAM}(t) + S_{64QAM}(t) - [\alpha \cdot cn(t) + \beta \cdot cn(t) + \gamma \cdot cn(t)]$$

$$S^*(t) = [S_{QPSK}(t) - \alpha \cdot cn(t)] + [S_{16QAM}(t) - \beta \cdot cn(t)] + [S_{64QAM}(t) - \gamma \cdot cn(t)]$$

$$(\alpha + \beta + \gamma = 1) \quad (2)$$

Note that the power spectral density of the clipping noise signal cn(t) is substantially constant with respect to frequency over a signal band of the transmission signal. Thus, the PAPR in the transmission signal is not sufficiently reduced only by performing the operation of the formula (2).

FIG. 9 illustrates subcarrier allocation and clipping noise. In this example, the QPSK signal, the 16QAM signal, and the 64QAM signal are allocated to frequency bands B1, B2, and B3, respectively. However, the power spectral density of the clipping noise signal cn(t) is substantially constant with respect to frequency over a signal band of the transmission signal. Thus, if the clipping noise signal cn(t) is divided into α·cn(t), β·cn(t) and γ·cn(t) by using the coefficients α, β and γ, "S*(t)=S(t)−cn(t)" is finally obtained after combining the output signals of the adders 39a-39c. In this case, the EVM of the transmission signal is to be identical with that obtained in the configuration illustrated in FIG. 3 irrespective of a ratio of α, β and γ.

This problem may be solved by controlling a band of the clipping noise signal cn(t) according to the modulation schemes. That is, if the frequency band of the clipping noise signal cn(t) is controlled according to the modulation schemes, it is possible to perform clipping for each modulation scheme and to control the quality (EVM in this example) for each modulation scheme. Thus, the transmitter 3 has the filters 39a-39c, as illustrated in FIG. 8. The filters 39a-39c are frequency selective filters that respectively pass specified frequency bands.

FIGS. 10A-10F illustrate an example of the filters 39a-39c. In this example, as illustrated in FIG. 10A, the QPSK signal, the 16QAM signal and the 64QAM signal are allocated in the frequency bands B1, B2 and B3, respectively. In addition, as illustrated in FIG. 10B, the power spectral density of the clipping noise signal cn(t) is substantially constant with respect to frequency over signal band of the transmission signal.

As illustrated in FIG. 10C, the QPSK signal in the time domain and the clipping noise component α·cn(t) are input to the filter 39a. The filter 39a passes the frequency band B1 for the QPSK signal and cuts off the other frequency components. Thus, the filter 39a outputs the QPSK signal and the clipping noise component α·cn(t) in the frequency band B1. Similarly, as illustrated in FIG. 10D, the 16QAM signal in the time domain and the clipping noise component β·cn(t) are input to the filter 39b. The filter 39b passes the frequency band B2 for the 16QAM signal and cuts off the other frequency components. Thus, the filter 39b outputs the 16QAM signal and the clipping noise component β·cn(t) in the frequency band B2. The 64QAM signal in the time domain and the clipping noise component γ·cn(t) are input to the filter 39c, as illustrated in FIG. 10E. The filter 39c passes the frequency band B3 for the 64QAM signal and cuts off the other frequency components. Thus, the filter 39c outputs the 64QAM signal and the clipping noise component γ·cn(t) in the frequency band B3.

The combiner 40 combines the output signals of the filters 39a-39c, as illustrated in FIG. 10F, and outputs a transmission signal $S_{out}(t)$. The QPSK signal is clipped by the clipping noise component α·cn. Similarly, the 16QAM signal is clipped by the clipping noise component β·cn. The 64QAM signal is clipped by the clipping noise component γ·cn. That is to say, clipping according to the modulation schemes is performed.

Note that a problem caused by peak regrowth in the filtered signal may occur in the configuration illustrated in FIGS. 10A-10F. Here, when a bandwidth of a frequency selective filter is narrow, a large peak regrowth is obtained. That is, when a bandwidth of a pass band of the filter 39a is narrow, a large peak regrowth may be obtained in the output signal of the filter 39a. Similarly, when a bandwidth of a pass band of the filter 39b is narrow, a large peak regrowth may be obtained in the output signal of the filter 39b. When a bandwidth of a pass band of the filter 39c is narrow, a large peak regrowth may be obtained in the output signal of the filter 39c. When the peak regrowth is large, this results in a state where the PAPR is not sufficiently reduced.

Figure 11A:
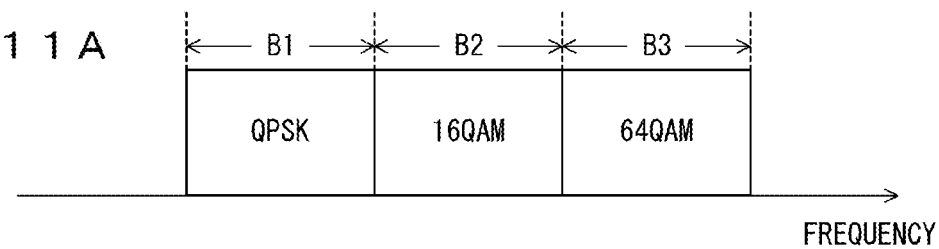
FIGS. 11A-11F illustrate another example of a configuration of filters.
Figure 11B:
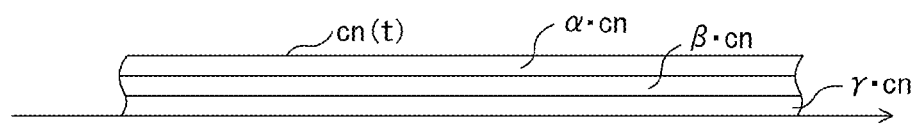

FIGS. 11A-11F illustrate another example of the filters 39a-39c. Also in this example, as illustrated in FIG. 11A, the QPSK signal, the 16QAM signal and the 64QAM signal are allocated in the frequency bands B1, B2 and B3, respectively. In addition, as illustrated in FIG. 11B, the power spectral density of the clipping noise signal cn(t) is substantially constant with respect to frequency over a signal band of the transmission signal.

Figure 11C:
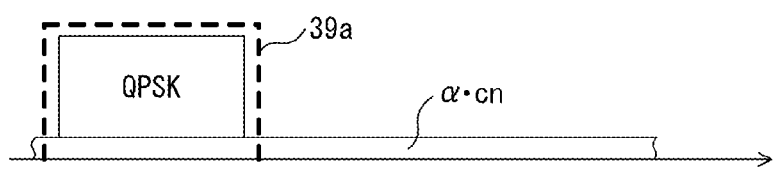

As illustrated in FIG. 11C, the QPSK signal and the clipping noise component α·cn(t) are input to the filter 39a. The filter 39a passes the frequency band B1 and cuts off the other frequency components similarly to the example illustrated in FIG. 10C. Thus, the filter 39a outputs the QPSK signal and the clipping noise component α·cn(t) in the frequency band B1.

Figure 11D:
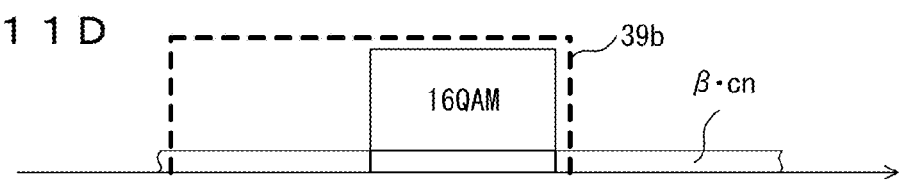

The 16QAM signal and the clipping noise component β·cn (t) are input to the filter 39b, as illustrated in FIG. 11D. The filter 39b passes the frequency bands B1 and B2, which is different from the example illustrated in FIG. 10D. Thus, the filter 39b outputs the 16QAM signal and the clipping noise component β·cn(t) in the frequency bands B1 and B2. That is, the filter 39b outputs the clipping noise component β·cn(t) not only in the frequency band B2 but also in the frequency band B1. Therefore, the clipping noise component β·cn(t) affects the QPSK signal allocated in the frequency band B1. However, the bandwidth of a pass band of the filter 39b is wider than that of the filter 39a. Thus, the peak regrowth in the filtered signal by the filter 39b is reduced compared with that of the filter 39a.

Figure 11E:
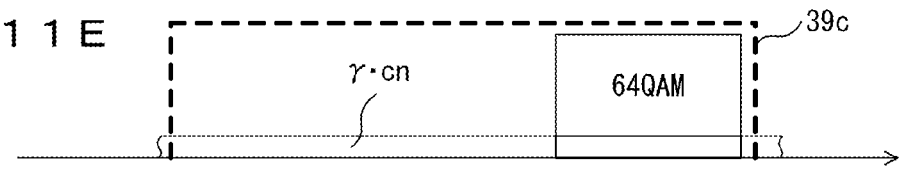

The 64QAM signal and the clipping noise component γ·cn (t) are input to the filter 39c, as illustrated in FIG. 11E. The filter 39c passes the frequency bands B1-B3, which is different from the example illustrated in FIG. 10E. Thus, the filter 39c outputs the 64QAM signal and the clipping noise component γ·cn(t) in the frequency bands B1-B3. That is, the filter 39c outputs the clipping noise component γ·cn(t) not only in the frequency band B3 but also in the frequency bands B1-B2. Therefore, the clipping noise component γ·cn(t) affects the QPSK signal allocated in the frequency band B1 and the 16QAM signal allocated in the frequency band B2. However, the bandwidth of a pass band of the filter 39c is further wider than that of the filter 39b. Thus, the peak regrowth in the filtered signal by the filter 39c is further reduced compared with that of the filter 39b.

As described, in the example illustrated in FIGS. 11A-11E, a frequency selective filter that has a wide pass band is implemented for a modulation scheme (64QAM in this example) in which high quality (smaller maximum acceptable EVM in this example) is requested. Thus, the peak regrowth is reduced in the modulation scheme in which high quality is requested.

Figure 11F:
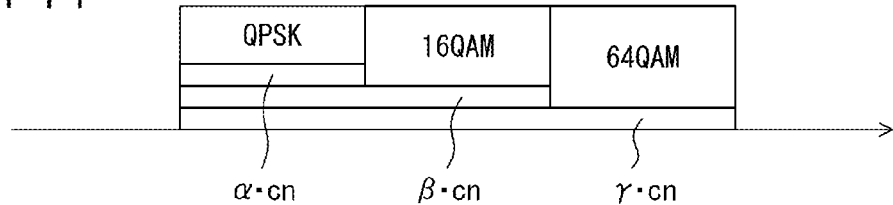

In addition, as illustrated in FIG. 11F, the clipping noise component that affects the 64QAM signal is only γ·cn(t). Therefore, the quality of the 64QAM signal is not greatly degraded by the clipping noise signal.

The 16QAM signal may be affected by the clipping noise components β·cn(t) and γ·cn(t). That is, the 16QAM signal may be more affected by the clipping noise signal than is the 64QAM signal. However, the maximum acceptable EVM of the 16QAM signal is larger than that of the 64QAM signal. Accordingly, it is easy or at least possible to make the EVM of the 16QAM signal smaller than the maximum acceptable EVM of 16QAM even when the 16QAM signal is affected by the clipping noise components β·cn(t) and γ·cn(t).

The QPSK signal may be affected by the clipping noise components α·cn (t), β·cn (t) and γ·cn (t). That is, the QPSK signal may be much more affected by the clipping noise signal than is the 16QAM signal or the 64QAM signal. However, the maximum acceptable EVM of the QPSK signal is larger than that of the 16QAM signal and the 64QAM signal. Accordingly, it is easy or at least possible to make the EVM of the QPSK signal smaller than the maximum acceptable EVM of QPSK even when the QPSK signal is affected by the clipping noise components α·cn(t), β·cn(t) and γ·cn(t).

The operations by the filters 39a-39c and the combiner 40 may be represented by the following formula (3).

$$S_{out}(t)=F_{QPSK}[S_{QPSK}(t)-\alpha \cdot cn(t)]+F_{16QAM}[S_{16QAM}(t)-\beta \cdot cn(t)]+F_{64QAM}[S_{64QAM}(t)-\gamma \cdot cn(t)] \quad (3)$$

$F_{QPSK}$, $F_{16QAM}$ and $F_{64QAM}$ represent the operations of the filters 39a, 39b and 39c, respectively.

The coefficients α, β and γ that are respectively multiplied by the clipping noise signal are determined based on target EVMs corresponding to the modulation schemes. The clipping level CL for each of the modulation schemes is as follows.

$$CL_{QPSK}=\alpha \cdot cn(t)$$

$$CL_{16QAM}=\beta \cdot cn(t)$$

$$CL_{64QAM}=\gamma \cdot cn(t)$$

The coefficients α, β and γ are determined to satisfy the condition "α+β+γ=1". Here, if the filters 39a-39c respectively pass all OFDM subcarriers, the formula (3) will be identical with the formula (2). However, the pass bands of the filters 39a-39c are respectively configured according to the modulation schemes in the transmitter 3 illustrated in FIG. 8. For example, the filter 39a implemented for QPSK passes only the frequency band B1. That is, the clipping noise component α·cn(t) does not affect modulated signals generated in the other modulation schemes (16QAM and 64QAM). Thus, the coefficient α may be larger than an expected value that is determined to satisfy the condition "α+β+γ=1". Therefore, it is possible to realize "α+β+γ>1" while requirements with respect to the maximum acceptable EVM for each modulation scheme are met. Note that "α+β+γ>1" indicates stronger clipping than that obtained in the transmitter 2 illustrated in FIG. 3. Namely, it is possible to further reduce the PAPR, while requirements with respect to the maximum acceptable EVM for each modulation scheme are met, in the configuration according to the embodiment of the present invention.

Each of the coefficients α, β and γ is determined based on, for example, a simulation on the EVM for a corresponding modulation scheme obtained when the transmission signal S(t) is clipped by a specified clipping level. The specified clipping level may be arbitrarily determined between the average power and the peak power of the transmission signal S(t).

The coefficient α is determined in such a way that the EVM of the QPSK signal is smaller than the maximum acceptable EVM (−15.1 dB) defined for QPSK by a specified amount. Similarly, the coefficient β is determined in such a way that the EVM of the 16QAM signal is smaller than the maximum acceptable EVM (−18.1 dB) defined for 16QAM by the specified amount. The coefficient γ is determined in such a way that the EVM of the 64QAM signal is smaller than the maximum acceptable EVM (−21.9 dB) defined for 64QAM by the specified amount.

The "specified amount" maybe determined within the range between 0 dB and 0.5 dB. In this case, each of the coefficients α, β and γ will be determined in such a way that a difference between the EVM of a modulated signal generated in a modulation scheme and the maximum acceptable EVM defined for the modulation scheme is smaller than the specified threshold (0.5 dB in this example). When the coefficients α, β and γ are determined in the aforementioned policy, since each of the modulated signals satisfies the maximum acceptable EVM defined by 3GPP, a receiver that receives the modulated signals does not necessarily include a dedicated circuit or function.

Accordingly, it is possible to perform stronger clipping on a modulated signal generated in a modulation scheme in which high quality is not requested (a modulation scheme with a larger maximum acceptable EVM in this example) compared with the transmitter 2 illustrated in FIG. 3. Therefore, the PAPR can be further reduced while requirements with respect to the maximum acceptable EVM for each modulation scheme are met.

In the examples illustrated in FIGS. 10A-11F, the QPSK signal, the 16QAM signal and the 64QAM signal are sequentially allocated from a lower frequency, but the present invention is not limited to this allocation. That is, the QPSK signal, the 16QAM signal and the 64QAM signal may be allocated to arbitrary subcarriers in the OFDM signal band. In the example illustrated in FIG. 12, the 16QAM signal is allocated to the frequency bands B1 and B4, the QPSK signal is allocated to the frequency band B2, and the 64QAM signal is allocated to the frequency band B3.

It is assumed that the pass bands of the filters 39a-39c are determined as the same policy illustrated in FIGS. 11A-11F. In this case, the filter 39a is configured to pass the frequency band B2 in which the QPSK signal is allocated and to cut off the other frequency components. The filter 39b is configured to pass the frequency band B2 in which the QPSK signal is allocated and the frequency bands B1 and B4 in which the 16QAM signal is allocated, and to cut off the other frequency components. The filter 39c is configured to pass the frequency band B2 in which the QPSK signal is allocated, the frequency bands B1 and B4 in which the 16QAM signal is allocated, and the frequency band B3 in which the 64QAM signal is allocated, and to cut off the other frequency components.

<Simulation>

FIGS. 13A-13C illustrate a simulation result on PAPR reduction. This simulation is performed under the following conditions.

Number of subcarriers: 1200;
Frequency: 20 MHz;
Modulation schemes: QPSK and 16QAM;
Subcarrier allocation (FIG. 13A): 600 subcarriers are allocated to the QPSK signal, and the other 600 subcarriers are allocated to the 16QAM signal;
Subcarrier allocation (FIG. 13B): 1000 subcarriers are allocated to the QPSK signal, and the other 200 subcarriers are allocated to the 16QAM signal; and
Coefficients: $\alpha=0.4$, $\beta=1-\alpha$.

The horizontal axis represents PAPR. The vertical axis represents a complementary cumulative distribution function (CCDF). Characteristics of "No clipping", "Related scheme" and "Embodiment" are compared. "No clipping" represents the PAPR characteristics in the transmission signal that is not clipped. "Related scheme" represents the PAPR characteristics in the transmission signal that is aggregately clipped by the transmitter 2 illustrated in FIG. 3. "Embodiment" represents the PAPR characteristics in the transmission signal that is clipped by the transmitter 3 illustrated in FIG. 8.

The PAPR is even reduced by clipping of the related scheme. That is, the PAPR is reduced from about 9.7 dB to about 6.5 dB at CCDF=$10^{-4}$ in the simulation illustrated in FIGS. 13A and 13B. Note that the same clipping level is applied to both QPSK and 16QAM in the related scheme. Thus, the EVM of the QPSK signal and the EVM of the 16QAM signal are approximately identical to each other. Here, in the related scheme, the clipping level is determined in such a way that both of the EVM of the QPSK signal and the EVM of the 16QAM signal are smaller than the maximum acceptable EVM (−18.1 dB) of 16QAM. Therefore, as illustrated in FIG. 13C, the EVM of the QPSK signal and the 16QAM signal are −18.3 dB and −18.5 dB, respectively. Note that the EVM of the QPSK signal has a margin of more than 3 dB with respect to the maximum acceptable EVM (−15.1 dB) of QPSK in the related scheme. That is to say, a stronger clipping may be performed on the QPSK signal.

In the clipping according to the embodiment, the PAPR is further reduced compared with the related scheme. For example, in the simulation illustrated in FIG. 13A, the PAPR is about 6.0 dB at CCDF=$10^{-4}$. That is, the PAPR is improved by about 0.5 dB compared with the related scheme. In the simulation illustrated in FIG. 13B, the PAPR is about 5.5 dB at CCDF=$10^{-4}$. In this case, the PAPR is improved by about 1.0 dB compared with the related scheme.

When clipping is performed in the transmitter 3 according to the embodiment, the EVM of the 16QAM signal is −18.17 dB or −18.23 dB and it is smaller than the maximum acceptable EVM (−18.1 dB) of 16QAM. The EVM of the QPSK signal is −15.16 dB or −15.51 dB and it is smaller than the maximum acceptable EVM (−15.1 dB) of QPSK. Note that, in the clipping according to the embodiment, the EVM of the QPSK signal has a small margin with respect to the maximum acceptable EVM of QPSK, which is different from the related scheme. That is to say, according to the configuration of the embodiment, the PAPR is sufficiently reduced while qualities that are specified for corresponding modulation schemes are satisfied.

<Other Embodiments>

FIG. 14 illustrates a configuration of a transmitter according to another embodiment of the present invention. The arrangement of the multipliers 37a-37c, the adders 38a-38c, and the filters 39a-39c are different from each other between the transmitter 3 illustrated in FIG. 8 and the transmitter 4 illustrated in FIG. 14. Note that the pass bands of the filters 39a-39c are substantially the same as the example illustrated in FIG. 8.

In the transmitter 4, the QPSK signal is clipped by the multiplier 37a, the adder 38a and the filter 39a. The multiplier 37a multiplies the clipping noise signal cn(t) by the coefficient $\alpha$. The filter 39a filters the signal "$-\alpha \cdot cn(t)$" output from the multiplier 37a. The adder 38a adds the output signal of the filter 39a to the QPSK signal. Thus, the QPSK signal is clipped in the time domain based on the coefficient and the filter band corresponding to QPSK. Note that a similar configuration is applied to other modulation schemes (16QAM and 64QAM). The operations performed in the configuration illustrated in FIG. 14 may be represented by following formula (4).

$$S_{out}(t)=[S_{QPSK}(t)-F_{QPSK}\{\alpha \cdot cn(t)\}]+[S_{16QAM}(t)-F_{16QAM}\{\beta \cdot cn(t)\}]+[S_{64QAM}(t)-F_{64QAM}\{\gamma \cdot cn(t)\}] \quad (4)$$

In the transmitter 4 illustrated in FIG. 14, the data signal (QPSK signal, 16QAM signal or 64QAM signal) is not filtered. Thus, it is preferable that dedicated filters be implemented for each of the data signals in order to reduce the out-of-band power of the data signal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A transmitter comprising:
a first IFFT (inverse fast Fourier transform) unit that generates a first time domain signal from a first modulated signal that is generated in a first modulation scheme and allocated in a first frequency band;

a second IFFT unit that generates a second time domain signal from a second modulated signal that is generated in a second modulation scheme and allocated in a second frequency band;

a clipping noise signal generator that generates a clipping noise signal that represents a difference between a combined signal of the first time domain signal and the second time domain signal and a specified threshold in a time period in which the power of the combined signal is higher than the specified threshold;

a first calculator that subtracts the clipping noise signal to which a first coefficient is multiplied from the first time domain signal;

a second calculator that subtracts the clipping noise signal to which a second coefficient is multiplied from the second time domain signal;

a first frequency filter that filters an output signal of the first calculator;

a second frequency filter that filters an output signal of the second calculator; and a combiner that generates a transmission signal that includes an output signal of the first frequency filter and an output signal of the second frequency filter, wherein when a maximum acceptable error vector magnitude specified for the first modulation scheme is larger than a maximum acceptable error vector magnitude specified for the second modulation scheme, the first frequency filter passes the first frequency band and cuts off frequency components other than the first frequency band, and the second frequency filter passes the first frequency band and the second frequency band and cuts off frequency components other than the first frequency band and the second frequency band.

2. The transmitter according to claim 1, wherein the first coefficient is determined in such a way that an error vector magnitude of the first modulated signal included in the transmission signal is smaller than the maximum acceptable error vector magnitude specified for the first modulation scheme, and the second coefficient is determined in such a way that an error vector magnitude of the second modulated signal included in the transmission signal is smaller than the maximum acceptable error vector magnitude specified for the second modulation scheme.

3. The transmitter according to claim 2, wherein the first coefficient is determined in such a way that a difference between the error vector magnitude of the first modulated signal included in the transmission signal and the maximum acceptable error vector magnitude specified for the first modulation scheme is smaller than a second specified threshold, and the second coefficient is determined in such a way that a difference between the error vector magnitude of the second modulated signal included in the transmission signal and the maximum acceptable error vector magnitude specified for the second modulation scheme is smaller than the second specified threshold.

4. The transmitter according to claim 1, wherein a sum of the first coefficient and the second coefficient is 1.

5. The transmitter according to claim 1, wherein a sum of the first coefficient and the second coefficient is larger than 1.

6. A transmitter comprising:

a first IFFT (inverse fast Fourier transform) unit that generates a first time domain signal from a first modulated signal that is generated in a first modulation scheme and allocated in a first frequency band;

a second IFFT unit that generates a second time domain signal from a second modulated signal that is generated in a second modulation scheme and allocated in a second frequency band;

a clipping noise signal generator that generates a clipping noise signal that represents a difference between a combined signal of the first time domain signal and the second time domain signal and a specified threshold in a time period in which the power of the combined signal is higher than the specified threshold;

a first frequency filter that filters the clipping noise signal to which a first coefficient is multiplied;

a second frequency filter that filters the clipping noise signal to which a second coefficient is multiplied;

a first calculator that subtracts an output signal of the first frequency filter from the first time domain signal;

a second calculator that subtracts an output signal of the second frequency filter from the second time domain signal; and a combiner that generates a transmission signal that includes an output signal of the first calculator and an output signal of the second calculator, wherein when a maximum acceptable error vector magnitude specified for the first modulation scheme is larger than a maximum acceptable error vector magnitude specified for the second modulation scheme, the first frequency filter passes the first frequency band and cuts off frequency components other than the first frequency band, and the second frequency filter passes the first frequency band and the second frequency band and cuts off frequency components other than the first frequency band and the second frequency band.

7. A peak-to-average power ratio reduction method comprising:

generating a first time domain signal from a first modulated signal that is generated in a first modulation scheme and allocated in a first frequency band;

generating a second time domain signal from a second modulated signal that is generated in a second modulation scheme and allocated in a second frequency band;

generating a clipping noise signal that represents a difference between a combined signal of the first time domain signal and the second time domain signal and a specified threshold in a time period in which the power of the combined signal is higher than the specified threshold;

subtracting the clipping noise signal to which a first coefficient is multiplied from the first time domain signal to generate a first clipped time domain signal;

subtracting the clipping noise signal to which a second coefficient is multiplied from the second time domain signal to generate a second clipped time domain signal;

filtering the first clipped time domain signal using a first frequency filter;

filtering the second clipped time domain signal using a second frequency filter; and generating a transmission signal that includes an output signal of the first frequency filter and an output signal of the second frequency filter, wherein when a maximum acceptable error vector magnitude specified for the first modulation scheme is larger than a maximum acceptable error vector magnitude specified for the second modulation scheme, the first frequency filter passes the first frequency band and cuts off frequency components other than the first frequency band, and the second frequency filter passes the first frequency band and the second frequency band and cuts off frequency components other than the first frequency band and the second frequency band.

\* \* \* \* \*